(12) United States Patent
Yun et al.

(10) Patent No.: US 8,677,149 B2
(45) Date of Patent: Mar. 18, 2014

(54) METHOD AND SYSTEM FOR PROTECTING INTELLECTUAL PROPERTY IN SOFTWARE

(75) Inventors: Ta Chun Yun, Singapore (SG); Viet Thang Nguyen, Singapore (SG)

(73) Assignee: C3S Pte. Ltd., Singapore (SG)

(*) Notice: Subject to any disclaimer, the term of this patent is extended or adjusted under 35 U.S.C. 154(b) by 96 days.

(21) Appl. No.: 13/323,786

(22) Filed: Dec. 12, 2011

(65) Prior Publication Data

US 2012/0151600 A1 Jun. 14, 2012

(30) Foreign Application Priority Data

Dec. 14, 2010 (SG) ................ 201009281-5

(51) Int. Cl.
*G06F 11/30* (2006.01)

(52) U.S. Cl.
USPC ........... 713/190; 713/189; 713/191; 713/192; 713/193; 711/163; 711/164; 717/127; 726/26; 726/27; 726/28; 726/29; 726/30; 726/31; 726/32

(58) Field of Classification Search
USPC ........... 713/189–193; 711/163–164; 717/127; 726/26–32
See application file for complete search history.

(56) References Cited

U.S. PATENT DOCUMENTS

| | | | |
|---|---|---|---|
| 7,512,985 B1 * | 3/2009 | Grabarnik et al. | 726/26 |
| 2006/0195703 A1 * | 8/2006 | Jakubowski | 713/190 |
| 2007/0250719 A1 * | 10/2007 | Lai et al. | 713/190 |
| 2008/0072069 A1 * | 3/2008 | Heithcock et al. | 713/192 |
| 2008/0181396 A1 * | 7/2008 | Balakrishnan et al. | 380/28 |

FOREIGN PATENT DOCUMENTS

| | | |
|---|---|---|
| WO | 2004/006133 | 1/2004 |
| WO | 2007/130320 | 11/2007 |

OTHER PUBLICATIONS

H. M. Meral et al., "Natural Language Watermarking via Morphosyntactic Alterations," Comp. Speech and Lang., vol. 23, Issue 1 (2009), pp. 107-125.

Examination Report issued in Singapore Patent Application No. 201009281-5, Intellectual Property Office of Singapore (as provided by the Hungarian Intellectual Property Office), Feb. 16, 2012 (6 pages).

* cited by examiner

*Primary Examiner* — Luu Pham
*Assistant Examiner* — Roderick Tolentino
(74) *Attorney, Agent, or Firm* — Martine Penilla Group, LLP

(57) ABSTRACT

A system and method for modifying material related to computer software. The system receives an original disclosure for a software system. A masquerading algorithm is applied to the original disclosure to generate a new disclosure. The subject matter of the new disclosure is different from the original disclosure but has the same functionality. The system also receives original source code for the software system and applies a camouflaging algorithm to the original source code to generate modified source code and conversion data for converting between the modified source code and the original source code.

19 Claims, 26 Drawing Sheets

```
+----------------------------------------------------------------------------------------
+ Name        : ULTRA-Vis.txt
+ Description : text-based RFP file
+----------------------------------------------------------------------------------------
```
 300

Urban Leader Tactical Response, Awareness & Visualization (ULTRA-Vis)

305

BACKGROUND

Current military operations are focusing efforts on urban and asymmetric warfare, as well as distributed operations, but small unit leaders lack the capability to issue commands and share mission-relevant information in an urban environment non-line-of-sight. Various factors that can impact mission effectiveness and tempo of operations are:

leaders communicate by shouting and hand signals,
teams operate within earshot and line-of-sight,
intra-squad radios are hard to hear, and
leaders must stop to use handheld displays.

Military operations in the urban terrain (extensive areas with hostile forces, non-combatant populations, and complex infrastructure) require special capabilities and agility to conduct close-combat operations under highly dynamic, adverse conditions. In short, tactical leaders need the ability to adapt on the move, coordinate small unit actions and execute commands across a wider area of engagement. Significant tactical advantages could be realized through the small unit leader's ability to intuitively generate/route commands and timely actionable combat information to the appropriate team or individual warfighter in a readily understood format that avoids
information overload.

Thus, the goal of the ULTRA-Vis program is to enable the small unit commander to disseminate commands and actionable combat information over a wider area to support distributed, nonlinear, operations. To accomplish this goal, the ULTRA-Vis program will be focused on:

developing information processing techniques to recognize/interpret a small unit leader's gesture/ voice commands,
develop techniques to create/disseminate/display geo-registered icons and actionable combat information for Fire Team Leaders/Dismount Warfighters in real time over an existing soldier radio network, and
developing/integrating the necessary critical enabling technologies, such as 1) a low profile, see-through display, and 2) demonstrating multi-modal iconic C2 in a NLOS, urban environment with prototype systems.

310

PROGRAM OVERVIEW

ULTRA-Vis consists of critical technology components that provide the platoon or squad leader with the ability to issue commands and tactical information to the squad or individual fire teams (as depicted in the example shown in Figure 1 below). ULTRA-Vis will develop the key technologies that allow unit leaders and members to selectively transmit critical combat information in the form of icons using low bandwidth soldier
voice and data radios.

The key technology areas to be developed include:

A multi-modal interface to recognize the leader's hand and arm signals (gestures) and voice commands. This interface will have the capability to recognize gesture, voice and tactile commands simultaneously for accurate interpretation.
An information management engine to interpret the command and convert it to a standard, geo-registered icon or symbol for dissemination. The information management engine will not only convert the commands to standard iconic forms, but also will merge data from other contextual and off-board sources into the data packet to be transmitted to the team or individual intended to receive the command.
A see-through display to overlay the icon on the battlefield as seen from each warfighter's own perspective. The small unit will be outfitted with low- profile, non-occluding head-mounted displays for overlay of geo-registered icons on the real world environment. A head-tracking navigation unit will serve to align and display the icon from each warfighter's perspective.

The advanced system will give each member of the unit the actionable combat information needed to increase awareness and enable dismounted units to be more effective in a distributed battle space. The system architecture shown below in Figure 2 is a notional concept describing functional capabilities and information flow for the ULTRA-Vis system. Offerors are encouraged to propose innovative approaches to achieve the highest level of overall system effectiveness, meeting or exceeding the program goals as outlined in this BAA. The proposed

Figure 3

```
+------------------------------------------------------------------------
+ Name     : ULTRA-Vis.eap
+ Description : Usecase-based requirement file                          400
+------------------------------------------------------------------------
                        405
Description
```
Military operations in the urban terrain (extensive areas with hostile forces, non-combatant populations, and complex infrastructure) require special capabilities and agility to conduct close-combat operations under highly dynamic, adverse conditions. In short, tactical leaders need the ability to adapt on the move, coordinate small unit actions and execute commands across a wider area of engagement. Significant tactical advantages could be realized through the small unit leader's ability to intuitively generate/route commands and timely actionable combat information to the appropriate team or individual warfighter in a readily understood format that avoids information overload.

Thus, the goal of the ULTRA-Vis program is to enable the small unit commander to disseminate commands and actionable combat information over a wider area to support distributed, nonlinear, operations. To accomplish this goal, the ULTRA-Vis program will be focused on:

- developing information processing techniques to recognize/interpret a small unit leader's gesture/ voice commands,
- develop techniques to create/disseminate/display geo-registered icons and actionable combat information for Fire Team Leaders/Dismount Warfighters in real time over an existing soldier radio network, and
- developing/integrating the necessary critical enabling technologies, such as 1) a low profile, see-through display, and 2) demonstrating multi-modal iconic C2 in a NLOS, urban environment with prototype systems.

410

Use-cases

411

1 Recognize Leader's commands
A multi-modal interface to recognize the leader's hand and arm signals (gestures) and voice commands. This interface will have the capability to recognize gesture, voice and tactile commands simultaneously for accurate interpretation.

The gesture recognition unit will provide the leader with the capability to convey standard hand and arm signals and affix icons to the battlespace through pointing actions. The task will show that hand and arm motions are distinctly recognizable through interpretation of data inputs from one or more sensors and clearly distinguishable from other gestures or actions. At least 10 standard visual signals (hand and arm gestures) must be used to demonstrate the functionality and accuracy of this system component. The gesture recognition unit will be capable of achieving at least 99% probability of recognition during testing procedures that will be clearly defined in the proposal.

412

2 Interpret Leader's commands

...

413

3 Dissemenate commands and information

...

414

4 Display data on see-through display

```
+-------------------------------------------------------------------------------
+ Name    : ULTRA-Vis.eap
+ Description : Usecase-based requirement file
+-------------------------------------------------------------------------------

Category: mobile, gesture recognition, voice recognition, visualization

Model tags: hand&arm recognition, voice recognition, geo-registered icon, head mounted
display, geo map Use-cases 1 Recognize Leader's commands
        Tags: interface;gestures;hand and arm;voice;commands;signals;recognize 2 Interpret Leader's commands
        Tags: squad;perspective;affix;viewing;accurately;affixed;milliradian;verify;

3 Dissemenate commands and information
        Tags: gesture;voice;iconic;command;tactile;sensor;processor;

4 Display data on see-through display
                    Tags: icon;display;unit;phase;battle;head;mounted;
```

705 — Model tags
710 — Use-cases
700

Figure 7

```
+----------------------------------------------------------------------------
+ Name       : ULTRA-Vis.eap
+ Description : Usecase-based requirement file
+----------------------------------------------------------------------------
```

Description
...

Use-cases

1Commands IntelBot
A multi-modal interface to recognize the leader's hand and arm signals (gestures) and voice commands. This interface will have the capability to recognize gesture, voice and tactile commands simultaneously for accurate interpretation.

The gesture recognition unit will provide the leader with the capability to convey standard hand and arm signals and affix icons to the battlespace through pointing actions. The task will show that hand and arm motions are distinctly recognizable through interpretation of data inputs from one or more sensors and clearly distinguishable from other gestures or actions. At least 10 standard visual signals (hand and arm gestures) must be used to demonstrate the functionality and accuracy of this system component. The gesture recognition unit will be capable of achieving at least 99% probability of recognition during testing procedures that will be clearly defined in the proposal.

2Interpret Operator's commands
...

3Communicate with IntelBot
...

4Observe InteBot on see-through display
...

5Go to target destination
...

Figure 11

```
+---------------------------------------------------------------------------------
+ Name      : ULTRA-Vis.eap
+ Description : Usecase-based requirement file
+---------------------------------------------------------------------------------
```

Description
   ...

Use-cases

1Commands IntelBot                                        1205
    A multi-modal interface to recognize the leader's *(operator, user, person)* hand and arm signals (gestures) and voice commands. This interface will have the capability to recognize gesture, voice and tactile commands simultaneously for accurate interpretation.

1205   The gesture recognition unit will provide the leader *(operator, user, person)* with the capability to convey standard hand and arm signals and affix icons to the battlespace *(area, space, scene)* through pointing actions. The task will show that hand and arm motions are distinctly recognizable through interpretation of data inputs from one or more sensors and clearly distinguishable from other gestures or actions. At least 10 standard visual signals (hand and arm gestures) must be used to demonstrate the functionality and accuracy of this system component. The gesture recognition unit will be capable of achieving at least 99% probability of recognition during testing procedures that will be clearly defined in the proposal.

1Interpret Operator's commands
    ...

2Communicate with IntelBot
    ...

3Observe InteBot on see-through display
    ...

4Go to target destination
    ...

```
//===============================================================================
==
// Name       : myprogram.cpp
// Author     : C3S Pte Ltd
// Description : Foggy Camouflager sample
//===============================================================================
==
#include <iostream>
#include "compute.h"
#define MIN 200
#define MAX MIN + 100                                                    1405
define AREA(radius) 3.14*3.14*radius using namespace std;

int main() {
        char msg[] = "Danger, reduce speed";
        Computation center = new Computationi();
        Vehicle v1 = new Vehicle();
Vehicle v1 = new Vehicle();
cout << "First Vehicle area: " << AREA(v1.R) << endl;
printf("Second Vehicle area: %f\n", AREA(v1.R));
float speed = center.velocity(time, v1.x, v1.y);
        printf("Speed of vehicle 1: %f\n",speed);
        if (center.collide(v1, v2))
                cout << msg;
        return 0;
```

```
// Name       : compute.h
//===============================================================================
==
Class Computation {                                                      1410
        public float velocity(int time, float x_coordinate, float y_coordinate);
        public bool collide(vehicle v1, vehicev2);
`
```

```
// Name       : compute.cpp
//===============================================================================
==
#ifndef COMPUTATION_CC
define COMPUTATION _CC float Computation::velocity(int time, float x_coordinate, float y_coordinate) {
        float v = 0;
        v = (time*time - 4.5*time + 1.76) * x_coordinate / (time*time*time/2 + y_coordinate);
        return v;
} bool Computation::collide(Vehicle v1, Vehicle v2) {                      1415
        // Distance between 2 centers
        float distance = 0;
        distance = (v1.x - v2.x)*(v1.x - v2.x) + (v1.y - v2.y)*(v1.y - v2.y);
        if (distance < (v1.R + v2.R)*( v1.R + v2.R))
                return true
        else
                return false;
```

Figure 14

```
// Name     : compute.cpp
//=================================================================================
===
#ifndef COMPUTATION_CC
define COMPUTATION _CC float Computation::velocity(int time, float x_coordinate, float y_coordinate) {         1605
    float v = 0;                              1605
        v = (time*time - CAM::getNumber(493)*time + CAM::getNumber(478)) * x_coordinate /
        (time*time*time/ CAM::getNumber(313) + y_coordinate);
    return v;
} bool Computation::collide(Vehicle v1, Vehicle v2) {
        // Distance between 2 centers
        float distance = 0;
        switch (CAM::getNumber(17)) {  1610
        case 372:
            distance = (v1.x + v2.x)*(v1.x - v2.x) - (v1.y - v2.y)+(v1.y - v2.y) + CAM::getNumber(3);
                break;
case 4012:
            distance = (v1.x - v2.x)*(v1.x - v2.x) + (v1.y - v2.y)*(v1.y - v2.y) + CAM::getNumber(98);
                break;                                              1620
}
        if (distance < sin(2*v1.R)+cos(2*v1.R)+2*sin(v1.R)*sin(v1.R)-
        (cos(v1.R)+sin(v1.R))*( cos(v1.R)+sin(v1.R))+(v1.R + v2.R)*( v1.R + v2.R))
            return true;
        else
            return false;
}
#endif
```

Figure 16

```
// Name      : compute.cpp
//===================================================================
=======
#ifndef COMPUTATION_CC                                    1805
define COMPUTATION _CC void* Computation::sequencer(int ID, int p1, vehicle p2, float p3, vehicle p4, float p5) {
        switch (CAM::getNumber(ID)){
        case 479:       return &velocity(p1, p3, p5);
        case 123:       return &velocity(p1, p4, p3);
        case 093:       return &collide(p2, p4);
        case 472:       return &collide(p4, p2);
}
}
```

```
...
using namespace std;

int main() {
        char msg[] = "Danger, reduce speed";
        Computation center = new Computationi();          1810
        Vehicle v1 = new Vehicle();
Vehicle v1 = new Vehicle();
cout << "First Vehicle area: " << AREA(v1.R) << endl;
printf("Second Vehicle area: %f\n", AREA(v1.R);
float speed;
switch (CAM::getNumber(23)){
        case 470:
        speed = (float)*(center.sequencer(748, time, v1, v1.x, v2, v1.y);
        break;
        case 702:
        speed = (float)*(center.sequencer(748, time, v2, v2.x, v2, v1.y);
        break;
        }
        printf("Speed of vehicle 1: %f\n",speed);
        if ((bool)*(center.sequencer(736, time, v1, v1.x, v2, v1.y)))
                cout << msg;
        return 0;
}
```

Figure 18

```
...
using namespace std;

int main() {
        char msg[] = "508~535~536~456~535~526~456~507~540~521~523~531~482~456~";
        Computation center = new Computationi();
        Vehicle v1 = new Vehicle();
Vehicle v1 = new Vehicle();
        cout<<CAM::getString("~1226~1259~1240~1242~1250~1175~1248~1258~1175~1244~1
        252~1255~1259~1264~1201~1175~", 606)<< AREA(v1.R) << endl;
        printf(CAM::getString("~449~480~481~401~466~479~401~470~477~470~478~470~479
        ~485~427~401~%f\n" , 915), AREA(v1.R);
float speed;
switch (CAM::getNumber(23)){
        case 470:
        speed = (float)*(center.sequencer(748, time, v1, v1.x, v2, v1.y);
        break;
        case 702:
        speed = (float)*(center.sequencer(748, time, v2, v2.x, v2, v1.y);
        break;
        }
        printf("387~408~421~412~416~408~423~408~421~365~339~%f\n",speed);
        if ((bool)*(center.sequencer(736, time, v1, v1.x, v2, v1.y)))
                cout << msg;
        return 0;
}
```

Figure 21

```
...
using namespace std;

int main() {
        char pigeon[] = "508~535~536~456~535~526~456~507~540~521~523~531~482~456~";
        Eagle crow = new Eagle();
        Penguin v1 = new Penguin();
Penguin v1 = new Penguin();
        cout<<BIRD::chicken("~1226~1259~1240~1242~1250~1175~1248~1258~1175~1244~125
2~1255~1259~1264~1201~1175~", 606)<< AREA(v1.R) << endl;
        printf(BIRD::chicken("~449~480~481~401~466~479~401~470~477~470~478~470~479~48
5~427~401~%f\n" , 915), AREA(v1.R);
float hawk;
switch (BIRD::duck(23)){
        case 470:
        hawk = (float)*( crow.crane(748, time, v1, v1.x, v2, v1.y);
        break;
        case 702:
        hawk = (float)*( crow. crane(748, time, v2, v2.x, v2, v1.y);
        break;
        }
        printf("387~408~421~412~416~408~423~408~421~365~339~%f\n",speed);
        if ((bool)*(crow. crane(736, time, v1, v1.x, v2, v1.y)))
                cout << pigeon;
        return 0;
}
```

Figure 22

```
/*27*/
#include <iostream>            2405
#include "henrry.h"              2405
#define LEMON 200                  2405
#define ORANGE LEMON + 100
define APPLE(pear) 3.14*3.14*pear using namespace std;

int main() {
        char pigeon[] = "508~535~536~456~535~526~456~507~540~521~523~531~482~456~";
        Eagle crow = new Eagle();
        Penguin v1 = new Penguin();
Penguin v1 = new Penguin();
        cout<<BIRD::chicken("~1226~1259~1240~1242~1250~1175~1248~1258~1175~1244~12
        52~1255~1259~1264~1201~1175~", 606)<< APPLE(v1.R) << endl;
        printf(BIRD::chicken("~449~480~481~401~466~479~401~470~477~470~478~470~479~
        485~427~401~%f\n" , 915), APPLE (v1.R);
float hawk;
switch (BIRD::duck(23)){
        case 470:
        hawk = (float)*( crow.crane(748, time, v1, v1.x, v2, v1.y);
        break;
        case 702:
        hawk = (float)*( crow. crane(748, time, v2, v2.x, v2, v1.y);
        break;
        }
        printf("387~408~421~412~416~408~423~408~421~365~339~%f\n",speed);
        if ((bool)*(crow. crane(736, time, v1, v1.x, v2, v1.y)))
                cout << pigeon;
        return 0;
}
```

Figure 24

```
/*27*/
#include <iostream>
#include "henrry.h"
#define LEMON 200
#define ORANGE LEMON + 100
define APPLE(pear) 3.14*3.14*pear using namespace std;

int main() {
        char pigeon[] =
"508~535~536~456~535~526~456~507~540~521~523~531~482~456~";
        Eagle crow = new Eagle();
        Penguin v1 = new Penguin();
Penguin v1 = new Penguin();
        cout<<BIRD::chicken("~1226~1259~1240~1242~1250~1175~1248~1258~1175~1244
        ~1252~1255~1259~1264~1201~1175~", 606)<< APPLE(v1.R) << endl;
        printf(BIRD::chicken("~449~480~481~401~466~479~401~470~477~470~478~470~4
        79~485~427~401~%f\n" , 915), APPLE (v1.R);
float hawk;
switch (BIRD::duck(23)){
        case 470:
        hawk = (float)*( crow.crane(748, cuckoo, v1, v1.x, v2, v1.y);
        break;
        case 702:
        hawk = (float)*( crow. crane(748, cuckoo, v2, v2.x, v2, v1.y);
        break;
        }
        printf("387~408~421~412~416~408~423~408~421~365~339~%f\n",speed);
        if ((bool)*(crow. crane(736, time, v1, v1.x, v2, v1.y)))
                cout << pigeon;
        return 0;
}
```

```
/*23*/
Class Eagle {
        public void* crane(int, int, Penguin, float, Penguin, float)
        public float flamingo(int cuckoo, float seagull, float swallow);
        public bool swan(Penguin v1, Penguin);
}
```

Figure 25

```
/*12*/
#ifndef CAMUCAMU
define CAMUCAMU void* Eagle:: crane(int ID, int p1, vehicle p2, float p3, vehicle p4, float p5) {
        switch (BIRD::duck(ID)){
        case 479:       return &flamingo(p1, p3, p5);
        case 123:       return &flamingo(p1, p4, p3);
        case 093:       return &swan(p2, p4);
        case 472:       return &swan(p4, p2);
        }
} float Eagle:: flamingo (int cuckoo, float seagull, float swallow) {
float v = 0;
        v = (cuckoo * cuckoo - BIRD::duck(493)*cuckoo + BIRD::duck(478)) * seagull / (cuckoo *
        cuckoo * cuckoo / BIRD::duck(313) + swallow);
        return v;
} bool Eagle:: swan(Penguin v1, Penguin v2) {
        /*22*/
        float owl = 0;
        switch (BIRD::duck(17)) {
        case 372:
        owl = (v1.x + v2.x)*(v1.x - v2.x) - (v1.y - v2.y)+(v1.y - v2.y) + BIRD::duck(3);
                break;
        case 4012:
        owl = (v1.x - v2.x)*(v1.x - v2.x) + (v1.y - v2.y)*(v1.y - v2.y) + BIRD::duck(98);
                break;
        }
        if (owl < sin(2*v1.R)+cos(2*v1.R)+2*sin(v1.R)*sin(v1.R)-
        (cos(v1.R)+sin(v1.R))*( cos(v1.R)+sin(v1.R))+(v1.R + v2.R)*( v1.R + v2.R))
                return true
        else
                return false;
}
#endif
```

Figure 26

METHOD AND SYSTEM FOR PROTECTING INTELLECTUAL PROPERTY IN SOFTWARE

FIELD OF THE INVENTION

This invention relates to the protection of intellectual property related to software applications. More particularly, this invention relates to modifying material related to software to hide the intellectual property. Still more particularly, this invention relates to a process for modifying disclosure documents and source code to hide the intellectual property described therein.

PRIOR ART

Outsourcing is a common occurrence during the development of a product, especially for software and IT projects, as an efficient way to acquire the proper expertise to handle certain problems while minimizing costs. By outsourcing development of certain components of a system to others, a business can focus resources on their particular areas of expertise. For example: a bio-medical company can focus on the development of a medical treatment model and outsource the development of the monitoring software to software experts.

In addition to outsourcing, businesses often collaborate with other groups on certain projects. Sometimes, a product becomes too big and too complex for a single business to develop all of the components. Thus, the business needs to cooperate with others, such as subcontractors, to develop all of the components. During the collaboration, the business often has to share confidential information and resources with the other parties.

Both outsourcing and collaboration require that content, or information, must be shared between the cooperating parties. The sharing of content or information leads to the risk that other party will misappropriate the Intellectual Property that arises from the collaboration. Therefore, businesses today are stuck in a dilemma. The businesses need to be able to share sensitive information while protecting the Intellectual Property rights that may be included in the information.

One well-known method for protecting information is encryption. However, encryption does not protect information that is shared with another party. Encryption merely protects the content from being received and understood by unintended parties. When encrypted data is received by an authorized user, the user may decrypt and use the information. Thus, encryption does not prevent an authorized party from misappropriating the information.

Another well known method for protecting information, particular to software development, is obfuscation. Obfuscation is the changing of source code to prevent subsequent users from understanding the entire process provided by the software. For example, obfuscated source code may include variable names that are disguised, workflows that are scrambled, and comments that are removed. The objective of obfuscation is to prevent others from reverse engineering the source code to understand and steal the intellectual content of the source code. Obfuscation of source codes does the IP protection purpose well. However, obfuscation prevents further development of obfuscated code. Thus, obfuscation is best used at the latter stages of the development cycle, namely the coding and implementation stages of development.

Thus, it is a problem to protect the intellectual property in information shared during collaboration. In particular, there are no solutions currently available for protecting the information shared during the earlier stages of the development cycle. Some examples of information shared during these earlier stages that require protection include the requirement specification, workflows, and source code. Businesses often need to share this information during corroboration with others on certain design solutions. Thus, there is a strong need for effective techniques that enable a business to securely share this information. Ideally, effective techniques should hide the real intention of the product. At the same time, the effective techniques should preserve the functionality and technical specification disclosed in the information.

SUMMARY OF THE INVENTION

The above and other problems are solved and an advance in the art is made by methods and systems in accordance with this invention. A first advantage of methods and systems in accordance with this invention is that specifications written in a natural language may be modified to mask the actual purpose of a product. A second advantage of methods and systems in accordance with this invention is that source code may be modified in a manner that allows further development of the source code without revealing the actual work flow and/or purpose of the source code.

The above and other advantages are provided by a process performed by a computer system in the following manner in accordance with embodiments of the present invention. The process begins by receiving an original disclosure for a software system written in a natural language. A masquerading algorithm is then applied to the original disclosure to generate a new disclosure. The new disclosure has subject matter that is different from the original disclosure. The system may then receive original source code for the software system. A camouflaging algorithm is then applied to the original source code to generate modified source code and conversion data. The conversion data includes information for converting between the modified source code and the original source code.

In accordance with some embodiments of the invention, the system may further compile the modified source code to generate modified executable code. The compiling of the modified source code may require the use of the conversion data to generate the modified executable code.

In accordance with embodiments of this invention, the masquerading algorithm may be performed in the following manner. Keywords are extracted from the original disclosure. A model template is then selected using the keywords. A new disclosure is then generated using the selected model template and the original disclosure.

In accordance with some of these embodiments, the keywords extracted from the original disclosure are displayed to a user. The system then receives the edited keywords from the user. In accordance with further of these embodiments, the extraction of the keywords may be performed in the following manner. First, a vocabulary library is read from memory. A keyword extraction algorithm is then applied to the original disclosure using the vocabulary library and the keywords are determined. In accordance with further embodiments, the disclosure has originally been documented in use case format.

In accordance with some of embodiments of this invention, the selection of the model template is performed in the following manner. A similarity value is determined for each use case of the original disclosure with each use case of the model template using a word similarity database. The word similarity database stores relationships between words and may provide the similarity values. In accordance with some of these embodiments, the selection of the model template may further include determining a template model that is a best match to the original disclosure based upon the similarity value of each use case of the original disclosure and the template model. In accordance with others of these embodiments, the selection of the model template may be performed in the following manner. The similarity value of each use case of the original disclosure and each use case of each of the model templates stored in a memory are determined and displayed. The user then enters an input, selecting one of the model templates.

In accordance with some embodiments of this invention, the new disclosure is generated in the following manner. A domain specific vocabulary library is read from memory. A keyword extraction algorithm is then applied to the new disclosure using the vocabulary library to determine the sensitive words in the new disclosure. The sensitive words from the new disclosure may then be displayed to the user. The user may then input edits to the sensitive words. The new disclosure is then modified with the received edits. In accordance with some of these embodiments, alternative words for each of the sensitive words are determined and displayed to the user. The user then inputs a selection of one of the alternative words to use to replace the sensitive word. The new disclosure is then altered by replacing the sensitive word with the selected alternative word.

In accordance with some embodiments of this invention, a camouflaging algorithm is applied to the original source code to generate modified source code and conversion data in the following manner. The process begins by receiving the source code. The received source code is then parsed. An equation is then identified in the parsed source code. A modified equation is then generated from the identified equation and replaces the equation in the source code. The original equation/expression in the modified source code is identifiable by a user key and a number generator function such as the Mersenne Twister pseudo random generating algorithm. One skilled in the art will recognize that other pseudo random generating algorithms other than Mersenne Twister may be used without departing from this invention.

In accordance with some embodiments, the modified equation is generated by inserting an addition of a function that returns a zero value to the equation. In accordance with some embodiments, the modified equation is generated by reordering the elements in the equation. In accordance with some embodiments of this invention, the modified equation is generated by generating a switch case including the equation and more than one secondary equation/expression that is to be added.

In accordance with further embodiments of the invention, the generation of the modified source code and conversion data further includes the identification of a function in the parsed source code, and the generation of a modified function from the identified function to replace the identified function in the modified source code. In accordance with some of these embodiments, the modified source code is generated by generating a switch case including the function and a secondary function with different parameters. One skilled in the art will recognize that more than one secondary function may be generated.

In accordance with some embodiments of this invention, the generation of the modified source code and conversion data includes the identification of a string in the source code and replacing the string with a replacement string in the modified source code. In accordance with some embodiments, the replacement string is received by invoking a string decryption function. In accordance with other embodiments, the replacement string is generated by generating a random number for each character in the string and adding the random number to an encoded value of the character to form a string of new characters.

In accordance with some embodiments of this invention, the modified source code is saved under a new file name. In accordance with some of these embodiments, the new file name is read from a library storing potential file names.

In accordance with some embodiments of this invention, the data conversion data is encrypted using a key. The key is then provided to the user for converting the original source code and/or compiling the modified source code. The user key may be used for string encryption, expression switch, expression constant addition and function switch.

BRIEF DESCRIPTION OF THE DRAWINGS

The above advantages and features of a method and system in accordance with this invention are described in the following detailed description and are shown in the drawings:

FIGS. 3 and 4 illustrating a disclosure of a software system to be modified by processes in accordance with an embodiment of this invention;

FIG. 7 illustrating a display of use cases of the disclosure document shown in FIGS. 3 and 4;

FIG. 11 illustrating a new disclosure based upon a template for the disclosure shown in FIGS. 3 and 4 generated in accordance with an embodiment of this invention;

FIG. 12 illustrating a display of the new disclosure with alternative selections for sensitive words in accordance with an embodiment of this invention;

FIG. 14 illustrating a file including source code to be modified;

FIG. 16 illustrating a file of modified source code for the source code of FIG. 14 that includes a modified equation in accordance an embodiment of with this invention;

FIG. 18 illustrating segments of the modified software including a modified function in accordance with an embodiment of this invention;

FIG. 21 illustrating a portion of modified source code with modified strings in accordance with this invention;

FIG. 22 illustrating a portion of modified source code with replacement identifiers as generated in accordance with an embodiment of this invention;

FIG. 24 illustrating a portion of modified source code with replacement macro identifiers as replaced in accordance with the process illustrated in FIG. 23; and FIGS. 25-26 illustrating modified source code for the source code shown in FIG. 14 as generated in accordance with an embodiment of this invention.

DETAILED DESCRIPTION

This invention relates to the protection of intellectual property related to software applications. More particularly, this invention relates to modifying material related to software to hide the intellectual property. Still more particularly, this invention relates to a process for modifying disclosure documents and source code to hide the intellectual property described therein.

Figure 1:
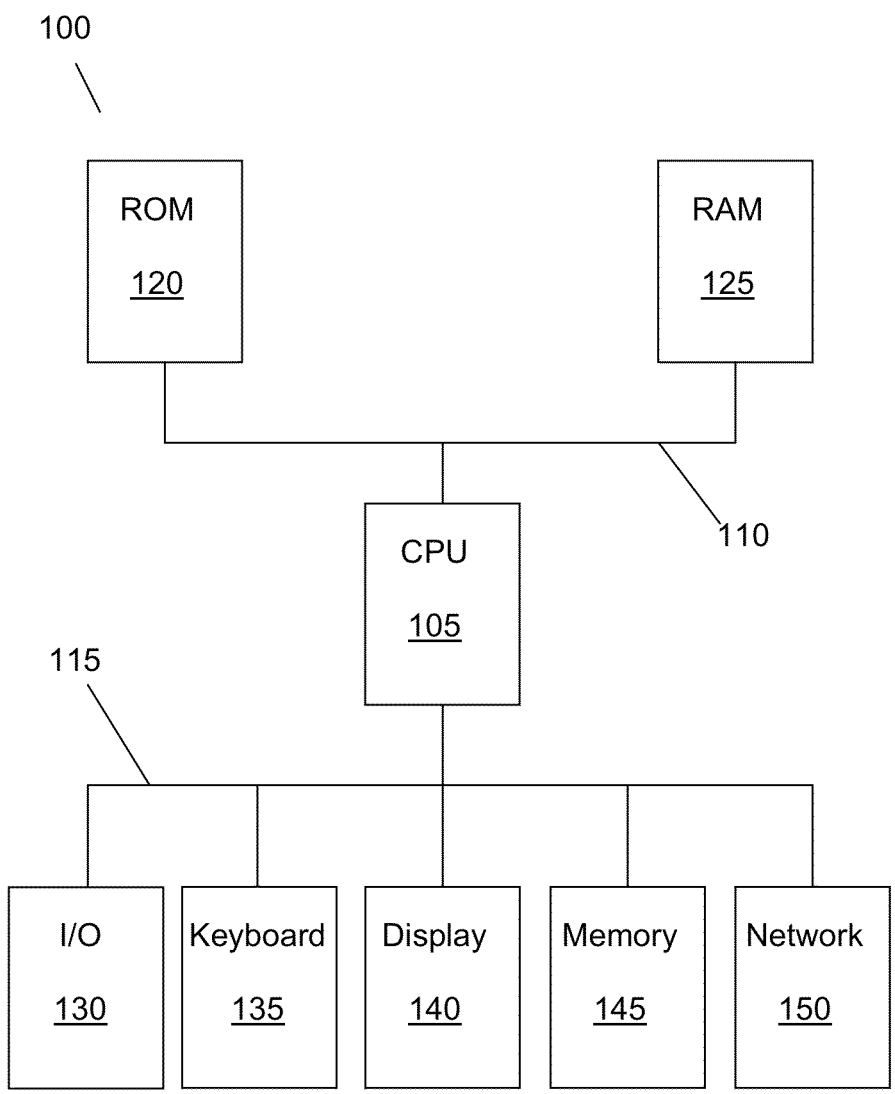
FIG. 1 illustrating a processing system that executes instructions stored in a media to perform processes for providing a method and/or system in accordance with this invention.

This invention is performed by processes provided by instructions stored by a media that are executed by a processing system. The instructions may be stored as firmware, hardware, or software. FIG. 1 illustrates processing system 100 that executes the instructions to perform the processes for providing a method and/or system in accordance with this invention. One skilled in the art will recognize that the exact configuration of each processing system may be different and the exact configuration of the executed processes in accordance with this invention will vary and FIG. 1 is given by way of example only.

Processing system 100 includes Central Processing Unit (CPU) 105. CPU 105 is a processor, microprocessor, or any combination of processors and microprocessors that execute instructions to perform the processes in accordance with the present invention. CPU 105 connects to memory bus 110 and Input/Output (I/O) bus 115. Memory bus 110 connects CPU 105 to memories 120 and 125 to transmit data and instructions between the memories and CPU 105. I/O bus 115 connects CPU 105 to peripheral devices to transmit data between CPU 105 and the peripheral devices. One skilled in the art will recognize that I/O bus 115 and memory bus 110 may be combined into one bus or subdivided into many other busses and the exact configuration is left to those skilled in the art.

A non-volatile memory 120, such as a Read Only Memory (ROM), is connected to memory bus 110. Non-volatile memory 120 stores instructions and data needed to operate various sub-systems of processing system 100 and to boot the system at start-up. One skilled in the art will recognize that any number of types of memory may be used to perform this function.

A volatile memory 125, such as Random Access Memory (RAM), is also connected to memory bus 110. Volatile memory 125 stores the instructions and data needed by CPU 105 to perform software instructions for processes such as the processes for providing a system in accordance with this invention. One skilled in the art will recognize that any number of types of memory may be used to provide volatile memory and the exact type used is left as a design choice to those skilled in the art.

I/O device 130, keyboard 135, display 140, memory 145, network device 150 and any number of other peripheral devices connect to I/O bus 115 to exchange data with CPU 105 for use in applications being executed by CPU 105. I/O device 130 is any device that transmits and/or receives data from CPU 105. Keyboard 135 is a specific type of I/O that receives user input and transmits the input to CPU 105. Display 140 receives display data from CPU 105 and display images on a screen for a user to see. Memory 145 is a device that transmits and receives data to and from CPU 105 for storing data to a media. Network device 150 connects CPU 105 to a network for transmission of data to and from other processing systems.

Figure 2:
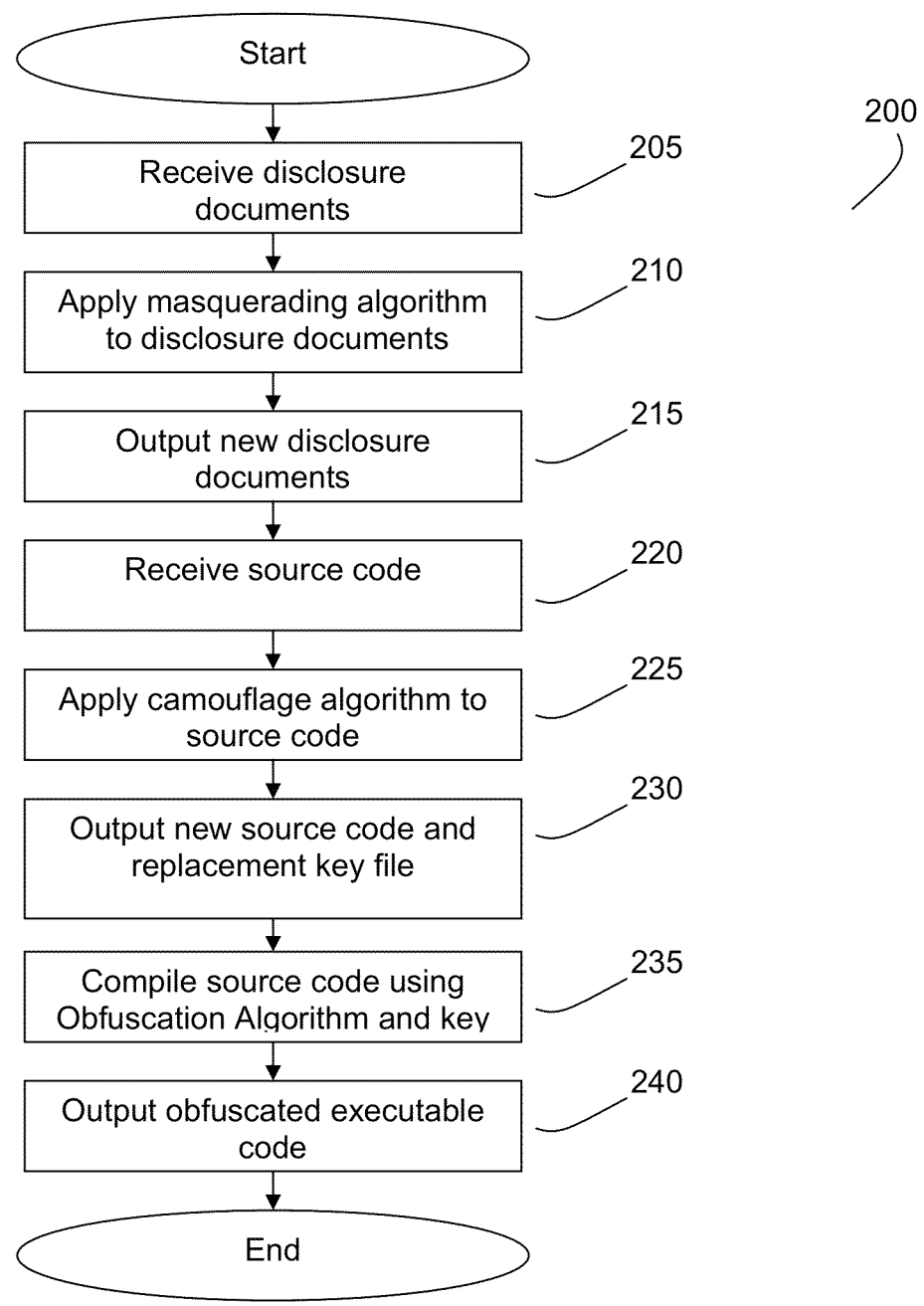
FIG. 2 illustrating a flow diagram of a process for modifying information about a software system in accordance with an embodiment of this invention.

FIG. 2 illustrates a flow diagram of process 200 for providing a method and/or system in accordance with an embodiment of this invention. In the shown embodiment, process 200 is stored as software instructions executed by processing system 100 shown in FIG. 1. Process 200 begins in step 205 by receiving a disclosure document or documents for a software system. The disclosure document(s) describes the objectives for the system. A further discussion of disclosure documents is provided below with regards to FIGS. 3 and 4. In step 210, a masquerading algorithm is applied to the disclosure document(s). Embodiments of a process for applying a masquerading algorithm are described below with reference to FIGS. 5-12. A new disclosure document is output by the masquerading algorithm in step 215.

In step 220, source code for a software system is received. The source code may be in one or more files. A camouflaging algorithm is then applied to the source code to generate modified source code and conversion data in step 225. The modified source code and conversion data are output in step 230. Embodiments of processes for performing the camouflaging algorithm are described below with reference to FIGS. 13-25.

After modified code is output, compiled code may be generated from the modified source code or original source code; and the conversion data using an obfuscation algorithm in step 235. The obfuscated compiled code is then output in step 240. Conventional processes may be used to provide the obfuscated compiled code and descriptions of these processes are omitted for brevity. After step 240, process 200 ends.

FIGS. 3 and 4 illustrate disclosure documents 300 and 400 respectively, for a project. In the shown embodiment, the disclosure documents present the disclosure information in a use-case model of the problem using Unified Modelling Language (UML) format. In the shown embodiment, the disclosure documents are expected to be in the UML use-case format. However, other formats may be used without departing from this invention. Document 300, shown in FIG. 3, includes background 305 and program overview 310. Background 305 sets forth the problem that the system is attempting to solve as well as the basic requirements of the system. Program overview 310 describes the components of the proposed system. Document 400 includes description 405 and uses-cases 410. Description 405 gives an overview of the objectives of the system. Use-cases 410 include individual use-cases 411-414 which provide the exact functions that the system must accomplish.

In documents 300 and 400 an Urban Leader Tactical Response, Awareness, and Visualisation (ULTRA-VIS) system is described. The ULTRA-VIS system is a military application for providing devices that recognize hand gestures and/or audible commands and provides the necessary information to handheld devices of other soldiers in order to coordinate operations. Given the sensitive nature of this system, a designer may not want corroborators to know the exact nature of the system. Thus, the designer may want to use the masquerader algorithms in accordance with embodiments of this invention. Documents 300 and 400 will be used in the following discussion to provide an example of processes implemented in accordance with embodiments of this invention. The ULTRA-VIS system example was obtained from the reference "BAA 08-36, http://www.darpa.mil/ipto/Programs/uvis/uvis.asp".

Figure 5:
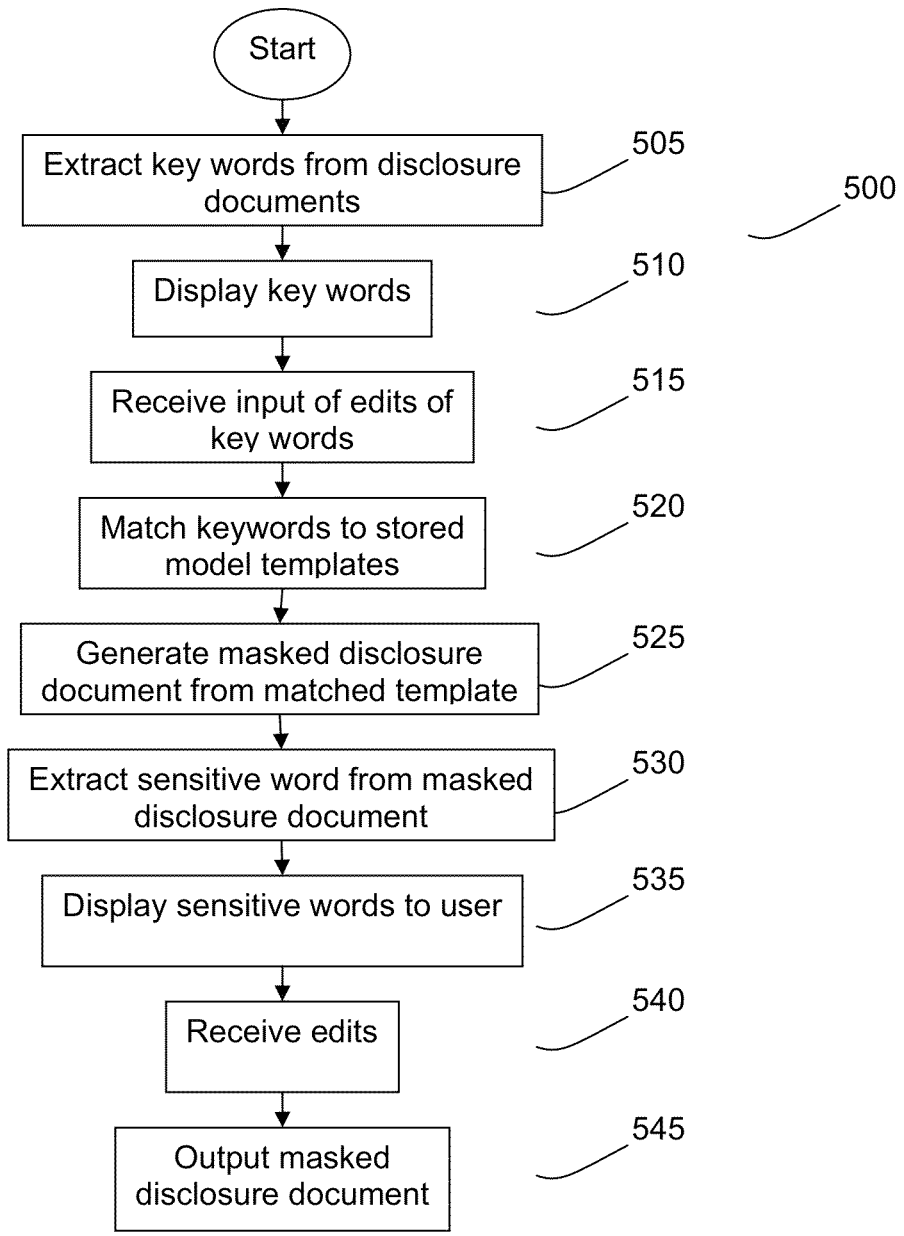
FIG. 5 illustrating a flow diagram of a process for generating a masked disclosure document from a disclosure document in accordance with an embodiment of this invention.

Process 500, shown in FIG. 5, is a process for applying a masquerader algorithm to a document to generate a masked document in accordance with this invention. For purposes of this invention, a masked document is a document that describes a different system than the system described in the original document. However, the system described in the masked document includes functions similar to those required by the system described in the original document. Process 500 begins in step 505 by extracting keywords from the original disclosure. An embodiment of a process for extracting keywords is described below with reference to FIG. 6. In step 510, the keywords extracted from the document are displayed to a user. The user may then edit the keywords in step 515.

The keywords are then used to match a model template to the original document in step 520. An embodiment for comparing model templates to the original document/disclosure is described below with reference to FIG. 8. The matched template is then used to generate a masked document in step 525. The sensitive keywords may be replaced with suitable equivalent words that are found using a library storing a thesaurus, similes, or other equivalent words in the description and/or use cases of the model template. The replacing of the sensitive keywords may be performed using a search and replace process that is similar to those commonly available word processing systems. In step 530, sensitive words are extracted from the masked document generated in step 525. An embodiment for extracting sensitive words from the masked document is described below with reference to FIG. 10. The extracted sensitive words are then displayed to the user in step 535. The user may then input edits to the sensitive words in step 540. The edits are then incorporated into the masked disclosure, and a masked disclosure is output in step 545 and process 500 ends.

Figure 6:
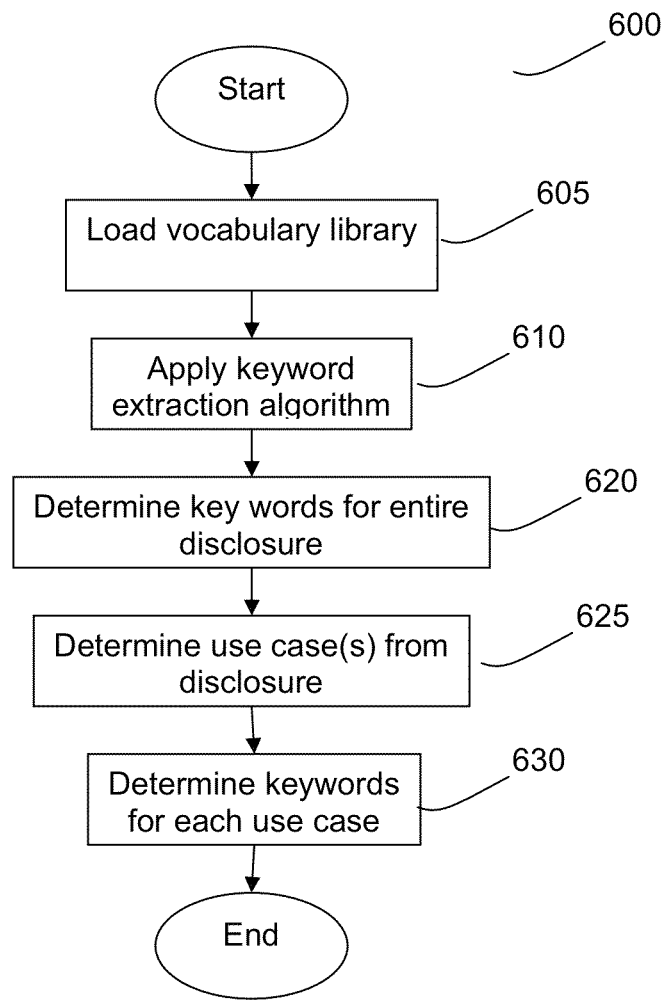
FIG. 6 illustrating a flow diagram of a process for extracting keywords from the disclosure document in accordance with an embodiment of this invention.

FIG. 6 illustrates process 600 that is an embodiment of a process for extracting keywords from a disclosure document in accordance with this invention. Process 600 begins in step 605 by loading a vocabulary library into memory. The library stores information about stored words including synonyms and hyponyms, and other information about the relatedness between certain words. In some embodiments, a selection may be made between multiple libraries where each library stores words related to specific technologies.

In step 610, a keyword extraction algorithm is applied to the documents to extract the keywords. An example of a keyword extraction algorithm is the Keyphrase Extraction Algorithm (KEA) described at http://www.nzdl.org/Kea/, which is available from the University of Waikato. However, one skilled in the art will recognize that other keyword extraction algorithms may be used without departing from this invention. In step 620, the algorithm returns the keywords extracted from the entire disclosure. The keywords extracted for each of the disclosure's use-cases are returned in step 625. In some embodiments, steps 620 and 625 may display optional keywords for the use cases to a user. The user then selects the keyword associated with the respective use cases. After the keywords are determined, the keyword extraction algorithm is used to determine the keywords for each use case in step 630 and process 600 ends.

FIG. 7 illustrates keywords extracted from documents 300 and 400. As discussed above, documents 300 and 400 describe an Ultra-Vis system. The words include words in category 700, model tags 705, and use-cases 710. As can be seen, the words in categories 700 include mobile, gesture recognition, voice recognition, and visualization. Model tags are the keywords for the original disclosure. In the shown embodiments, the model tags include hand and arm recognition, voice recognition, geo-registered icon, head mounted display, and geo map. Each separate use case tag is a keyword specified for each use case as shown in FIG. 7.

Figure 8:
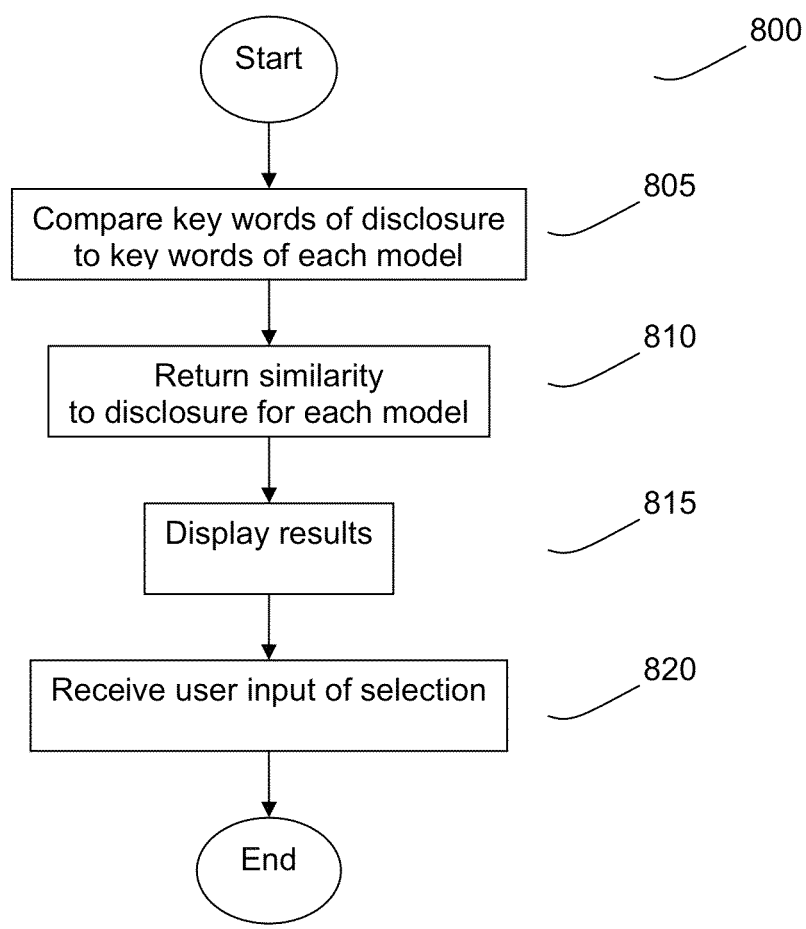
FIG. 8 illustrating a process for determining a model template in accordance with an embodiment of this invention.

FIG. 8 illustrates process 800 that is an embodiment of a process for selecting a model template to generate a masked disclosure in accordance with an embodiment of this invention. Process 800 begins in step 805 by comparing the keywords extracted from the disclosure documents to keywords of each of the model templates stored in memory. The model templates are each a generic description of a particular product.

In one embodiment of step 805, the comparison is performed in the following manner. A model similarity module includes a similarity-measuring algorithm, a model template database and a word similarity database. Similarity measurements between two models are based on the similarity between use-cases of the two models, and similarity measurements between use-cases of the two models are based on the similarities between the keywords of the use-cases of the two models.

The similarity measuring algorithm represents each model (the product from the disclosure documents and a model template) as a set of use-cases, and each use-case is represented by a set of keywords. The model similarity is defined by:

$$\text{sim}(\text{model\_1}, \text{model\_2}) = \text{best\_match}(\{ucX | ucX \in \text{model\_1}\}, \{ucY | ucY \in \text{model\_2}\})$$

where best_match(set1, set2) is the matching algorithm for the assignment problem as referenced at "http://en.wikipedia.org/wiki/Assignment_problem". best_match(set1, set2) method assigns each element from set1 to another element from set2. Each assignment will give a similarity value. This similarity value between any two use-cases will be calculated in the following paragraph. best_match( ) tries to find a solution so that the sum of all similarity values of the paired elements is maximized. The sum then represents the similarity between set 1 and set 2.

The above best_match( ) function requires the similarity value between every two use-cases. The use-case similarity is defined by:

$$\text{sim}(uc\_1, uc\_2) = \text{best\_match}(\{wordX | wordX \in uc\_1\}, \{wordY | wordY \in uc\_2\})$$

where best_match(set1, set2) is the matching algorithm for the assignment problem, and the word similarity value is taken from a predefined word similarity database or from a word-similarity measuring tool.

In step 810, the similarity value between the original disclosure and each model input is returned. These results are then displayed in step 815. The user then inputs a selection template model for use in generating the masked disclosure in step 820. Alternatively, the process can simply return the template with the highest similarity value to generate the masked document.

Figure 9:
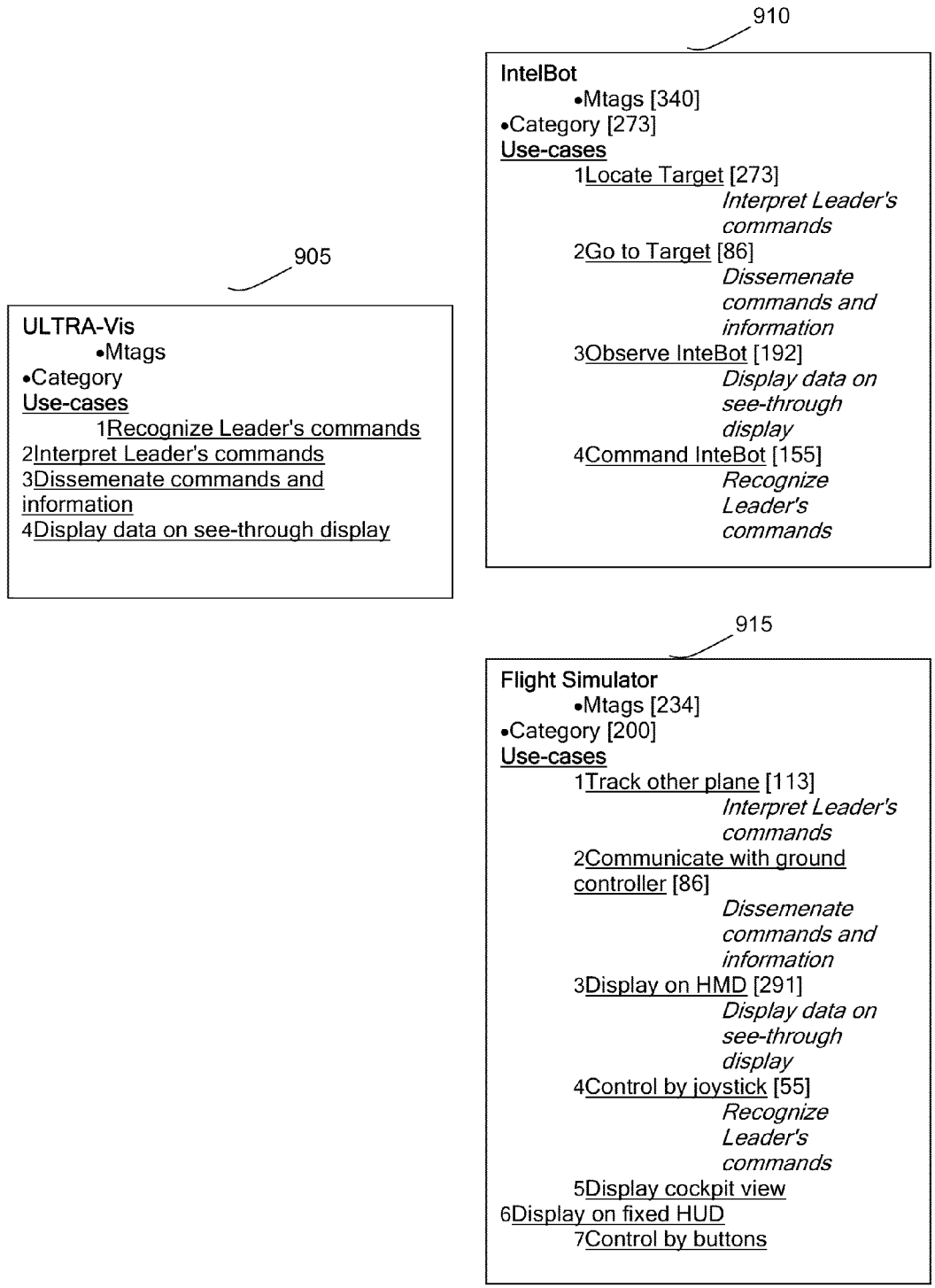
FIG. 9 illustrating use cases of the disclosure document shown in FIGS. 3 and 4; and of model templates.

FIG. 9 illustrates a comparison performed in accordance with process 800 between the disclosure of documents 300 and 400; and two model templates. File 905 lists all of the keywords and use cases for the disclosed documents 300 and 400. File 910 includes the model tags, category words, and use cases for a robotics intelligence system designated "Intelbot". The similarity values for each subject is provided in "[ ]" next to the subject. File 915 includes the meta-tags keyword, category keywords, and use cases for a flight simulator. As can be seen from FIG. 9 the similarity values for each subject of the Intelbot are greater on average than the similarity values for each subject of the flight simulator. The greater similarity values of the Intelbot suggest that the Intelbot is a better module template for generating the masked disclosure.

Figure 10:
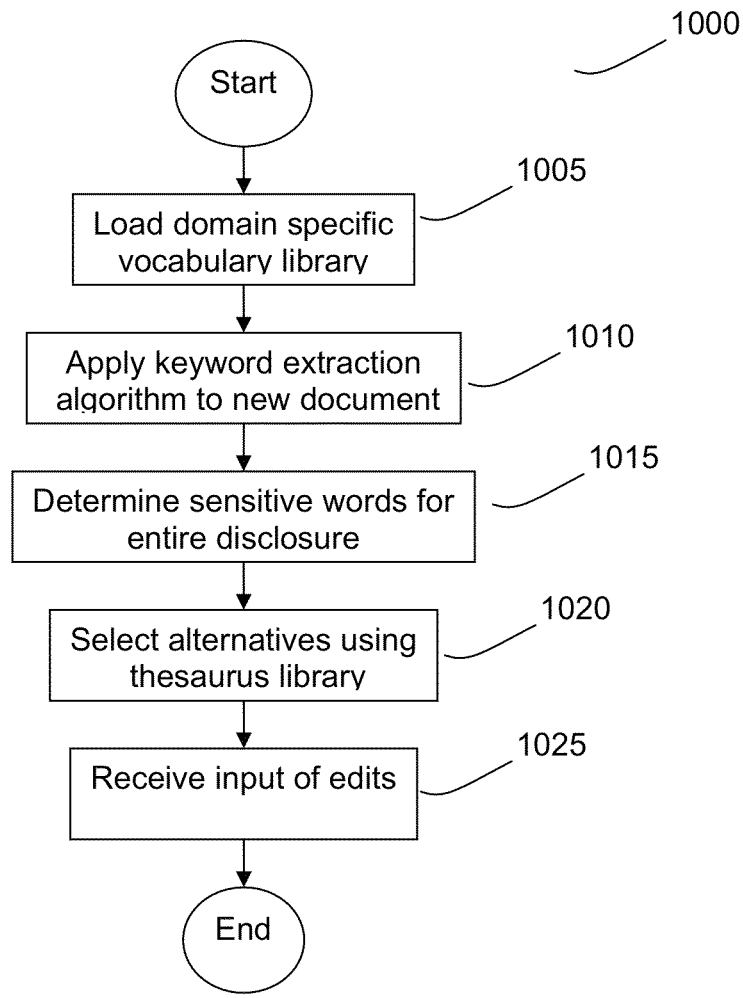
FIG. 10 illustrating a process for extracting and modifying sensitive words in a new disclosure in accordance with an embodiment of this invention.

After the model template is selected, the masked disclosure is generated as described in step 525 of process 500 (FIG. 5). The generation may be done by word replacement and/or mixing of use cases that are determined to be related using the best_match( ) process described above. After the masked disclosure is generated, sensitive words in the masked disclosure are extracted and may be edited. FIG. 10 illustrates a process 1000 that is an embodiment of a process for extracting and editing of sensitive words in accordance with this invention.

Process 1000 begins in step 1005 by loading a vocabulary library. The library stores information about stored words including synonyms and hyponyms, and other information about the relatedness between certain words. In some embodiments, a selection may be made between multiple libraries where each library stores words related to specific technologies.

In step 1010, a keyword extraction algorithm is applied to the generated masked disclosure to extract the sensitive words. The word extraction algorithm described above, in relation to process 600, is available from the University of Waikato. This Keyphrase Extraction Algorithm (KEA) described at http://www.nzdl.org/Kea/) may also be used to extract the sensitive words. However, one skilled in the art will recognize that other word extraction algorithms may be used without departing from this invention. In step 1015, the algorithm returns the sensitive words obtained from the entire masked disclosure. In step 1020, the alternative words for the sensitive words are determined using word similarity libraries. These alternative words are displayed to the user. The user may input a selection of an alternative word to replace the sensitive word and the masked disclosure is amended accordingly in step 1025. Process 1000 then ends.

FIG. 11 illustrates masked disclosure 1100 which is a disclosure derived from the ULTRA-VIS system disclosed in documents 300 and 400; and the model template for Intelbot. As can be seen from FIG. 11, the use cases of the Intelbot and ULTRA-VIS system were merged to create masked disclosure 1100. FIG. 12 illustrates masked disclosure 1100 with alternatives 1205 provided for the sensitive words. The user may select one of the alternatives to replace all of the occurrences of a sensitive word or replace the sensitive word one occurrence at a time to form the final masked document.

Figure 13:
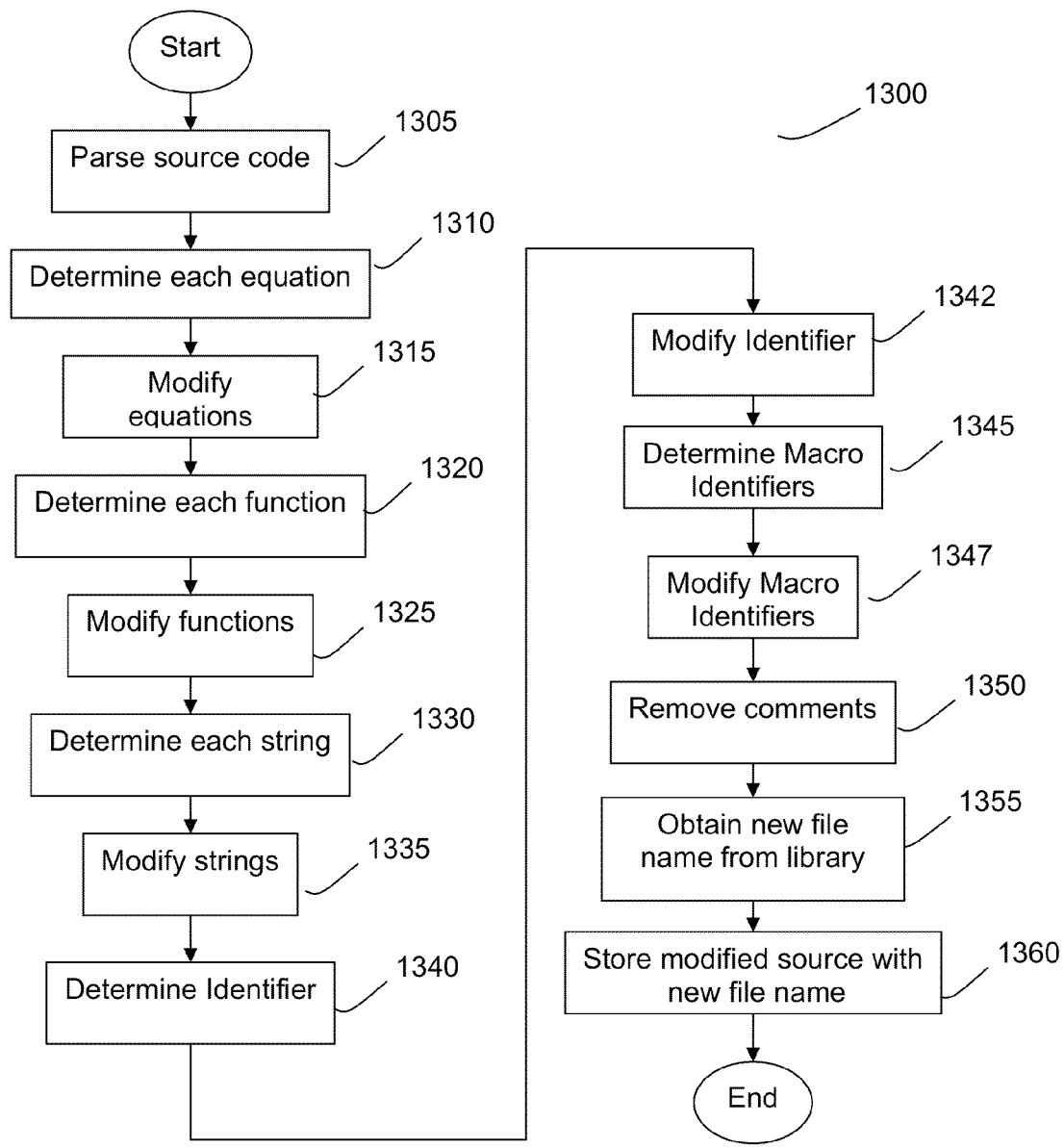
FIG. 13 illustrating a flow diagram of a process for generating modified source code in accordance with an embodiment of this invention.

FIG. 13 illustrates process 1300 that is an embodiment of a process for applying a camouflaging algorithm to received source code with regards to step 225 of process 200 (FIG. 2) in accordance with this invention. Process 1300 begins in step 1305 by parsing the received source code. In step 1310, an equation is read from the parsed source code. The equation is then modified and inserted into the modified source code in step 1315. An embodiment of a process for modifying an equation is described below with respect to FIG. 15. One skilled in the art will recognize that steps 1310 and 1315 may be performed on any and/or all of the equations found in the parsed source code.

The parsed source code is then searched for functions. A function is then found step 1320. The function is then modified and inserted into the modified source code in step 1325. An embodiment of a process for modifying a function is described below with respect to FIG. 17. One skilled in the art will recognize that steps 1320 and 1325 may be performed on any and/or all of the functions found in the parsed source code.

The parsed source code is then searched for strings. For purposes of this discussion, a string is a group of ASCII characters used as an identifier. A string is then discovered in step 1330. The string is then modified and inserted into the modified source code in step 1335. An embodiment of a process for modifying a string is described below with respect to FIG. 19. One skilled in the art will recognize that steps 1330 and 1335 may be performed on any and/or all of the strings discovered in the parsed source code.

In step 1340, the parsed search code is searched for identifiers. For purposes of this discussion, an identifier is a word or string of characters used to identify a function, constant, and/or a value in the source code. A replacement identifier is then determined and inserted into the modified source code in step 1342. An embodiment of process for modifying an identifier is described below with respect to FIG. 20.

In step 1345, the parsed search code is searched for macro identifiers. A replacement macro identifier is then determined and inserted into the modified source code for a found macro identifier in step 1347. An embodiment of a process for modifying a macro identifier is described below with respect to FIG. 23.

In step 1350, all comments in the original source code are removed from the modified source code. A new file name is then read from a library of possible file names in step 1355 and the modified code is saved under the read file name in step 1360 and process 1300 ends.

FIG. 14 illustrates original source code 1400 that will be used to provide examples for the processes described below. Source code 1400 includes a main application file 1405 that includes global definitions and a main process to execute. Object file 1410 includes an object class "computation" that includes to attributes: "velocity" and "collide". Definition file 1415 includes the definitions of the velocity and collide functions for use in the main process.

Figure 15:
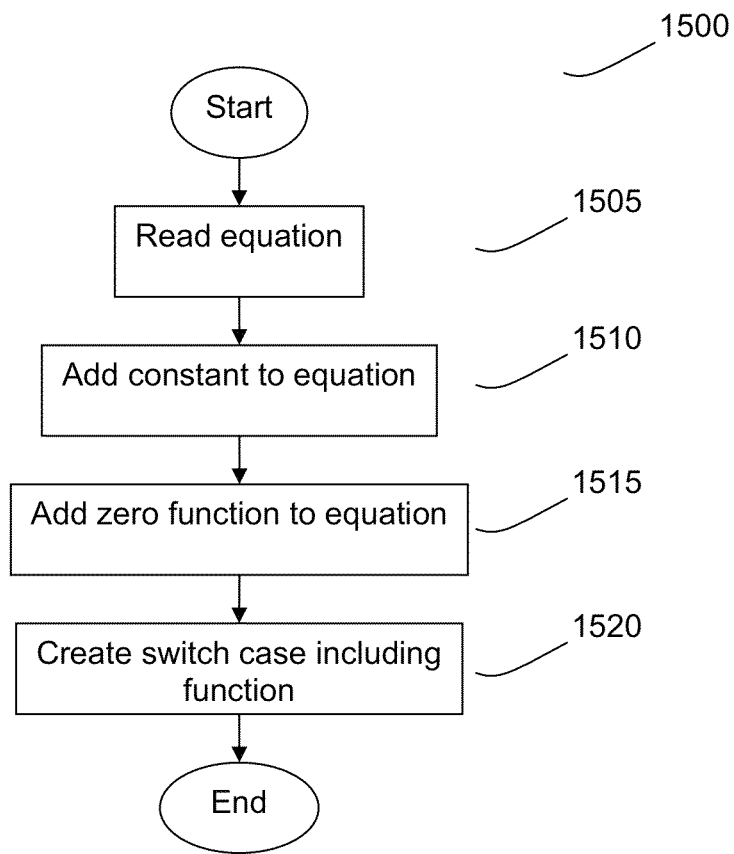
FIG. 15 illustrating a flow diagram of a process for modifying an equation in the received source code in accordance with an embodiment of this invention.

FIG. 15 illustrates process 1500 that is an embodiment of a process for modifying an equation to include the equation in the modified source code. Process 1500 begins in step 1505 by reading the equation to modify from the parsed source code. After step 1505, one or more of the following steps may be used to modify the equation. In step 1510, a constant formula is added to the equation. Ideally, the constant formula is a function that returns a zero value such that the addition of the function to the equation does not affect the results of the equation. An example of a constant number formula is provided as follows:

Assuming there is a function $\{808-\text{getNumber}(432)\}$. With a correct user key, the getNumber(432) function will return the value of 808. Therefore, $808-\text{getNumber}(432)$ will equate to zero.

Another manner for modifying an equation is performed in step 1515. In step 1515, zero equations are appended to the original equation. An example of a zero equation function is provided as follows:

$$\{\sin^2 x + \cos^2 x - 1 = 0\} \text{ or } \{(p^n-1)/(p-1) - p^{n-1} - p^{n-2} \ldots -p-1=0\}$$

Step 1520 provides another method for modifying the equation. In step 1520, a switch case is implemented by including the original equation and one or more alternative equations. The alternative equations may be generated by changing one or more operators in the equation. Preferably, the camouflage algorithm includes a hierarchy for the replacement of the operators to determine which operators will be used to replace the operators in the original equation. When the switch case is then generated, the placement of the original equation should be varied in the generated switch cases to further hide the original equations in the modified software. The proper case including the original expression is located by the correct user key and the switch number through a library number-generating function. Process 1500 ends after the equation is modified.

FIG. 16 illustrates the equations in definition file 1415 of source code 1400 that have been modified in accordance with process 1500. In the shown velocity function, function call 1605 replaces the constants of the equation in accordance with step 1510. In the collide function, switch case 1610 has been generated. Switch case 1610 includes the original equation in case 4012 of the switch cases and a second equation generated by changing the operators in the original equation in second switch case 372. Further, a constant function has been added to equation 1620.

Figure 17:
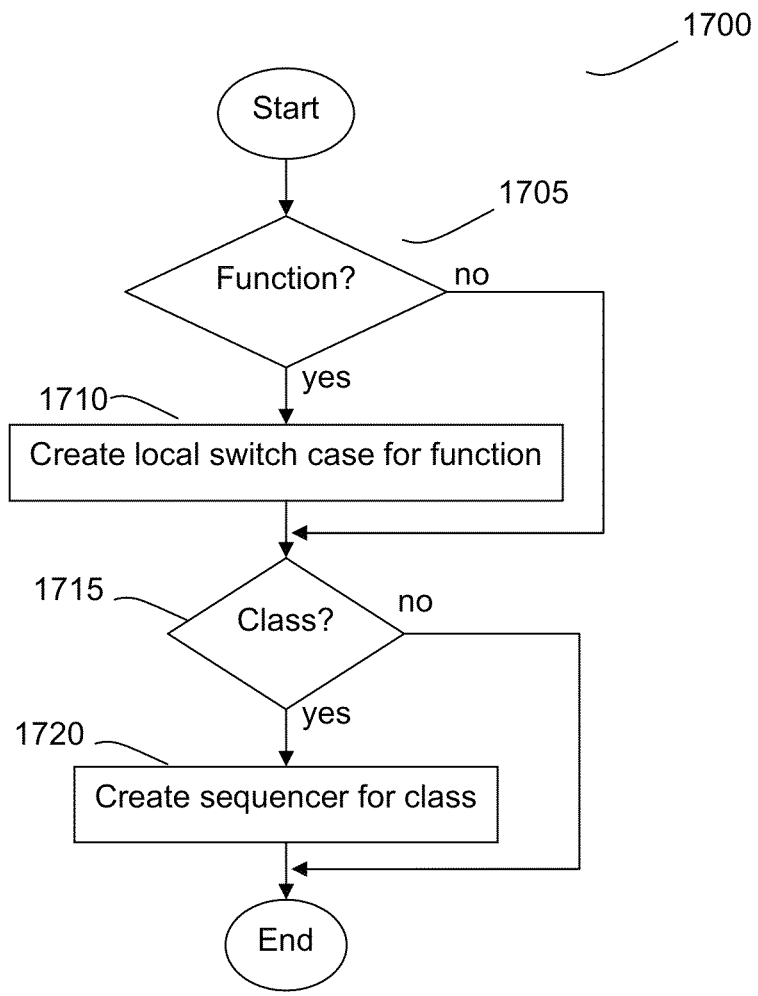
FIG. 17 illustrating a flow diagram of a process for modifying a function in the received source code in accordance with an embodiment of this invention.

FIG. 17 illustrates process 1700 that is an embodiment of a process for generating a modified function in accordance with an embodiment of this invention. In step 1705, it is determined if the selected function is a function call. If so, a switch case is generated for the function by step 1710 in the same manner as described with respect to step 1520 of process 1500 (FIG. 15). In step 1715, it is determined if the function is a class object. If the function is a class object, a sequencer is generated for the class. A sequencer is generated in the following manner. First, the parameters of a function of the class are read and inserted as parameters of the class. The function is then inserted as a switch case of the switch. The process is then repeated for each of the functions of the class. The proper function is then provided a switch identifier as a parameter. The proper switch cases and sequences are then stored in the conversion data for later use and process 1700 ends.

FIG. 18 illustrates the class "computation", which has sequencer 1805 added in accordance with step 1715. The equation "speed" in the original software has been modified to include switch case 1810 in accordance with step 1710.

Figure 19:
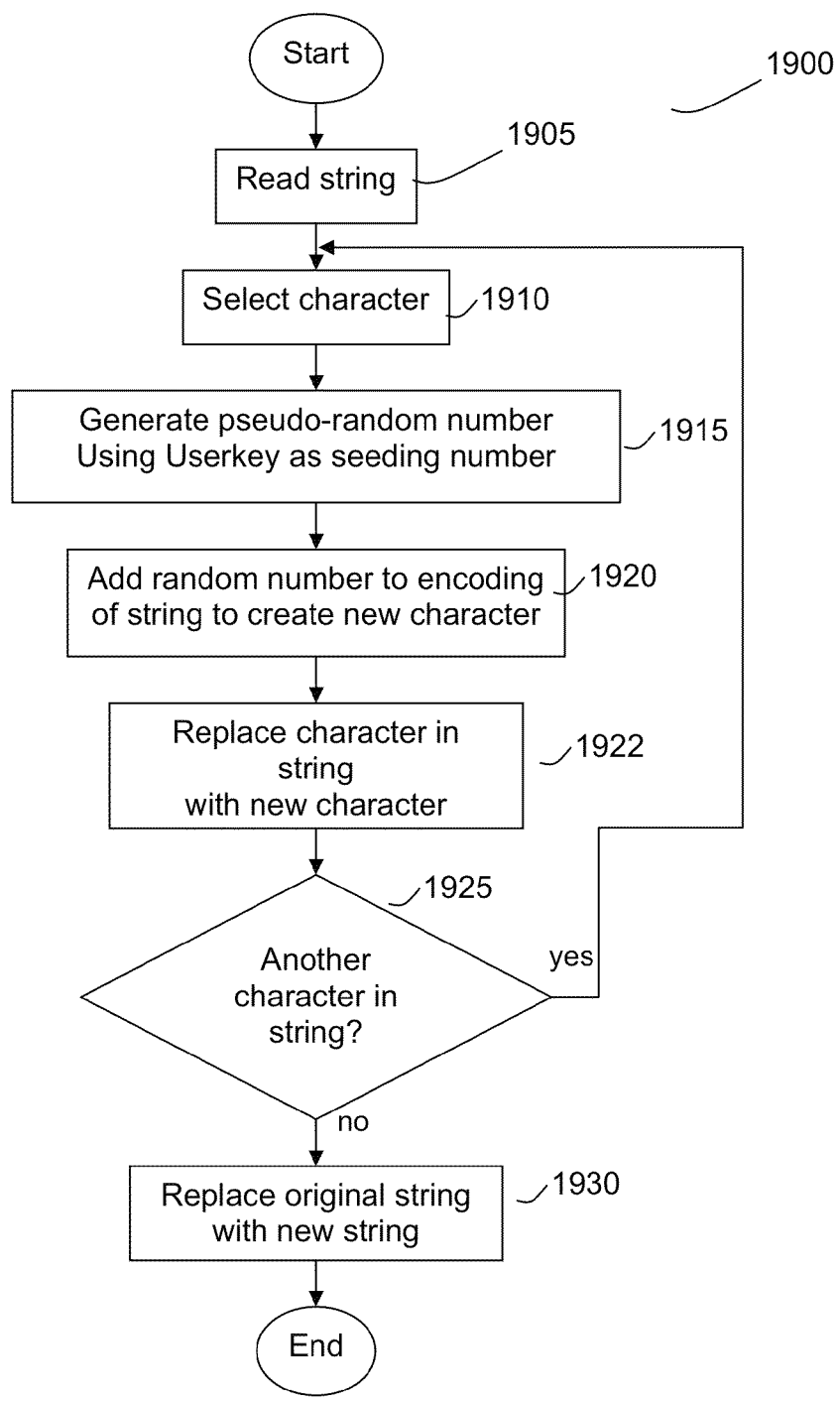
FIG. 19 illustrating a flow diagram of a process for encoding a new string in accordance with an embodiment of this invention.

FIG. 19 illustrates process 1900 that is an embodiment for a process of encoding strings in accordance with an embodiment of this invention. Process 1900 begins in step 1905 by reading a string in the parsed data. In step 1910, a character in the string is then selected. In step 1915, a random number generator generates a random number. In step 1920, the generated random number is added to the encoded value of the character to generate a new character. The new character then replaces the original character forming a new string in step 1922. In step 1925, process 1900 determines if the end of the string has been reached. If the end of the string has not been reached, process 1900 repeats from step 1910. When all of the characters of the string have been replaced, an indication of the relationship between the original string and the new string is stored in the conversion data in step 1930 and process 1900 ends.

Figure 20:
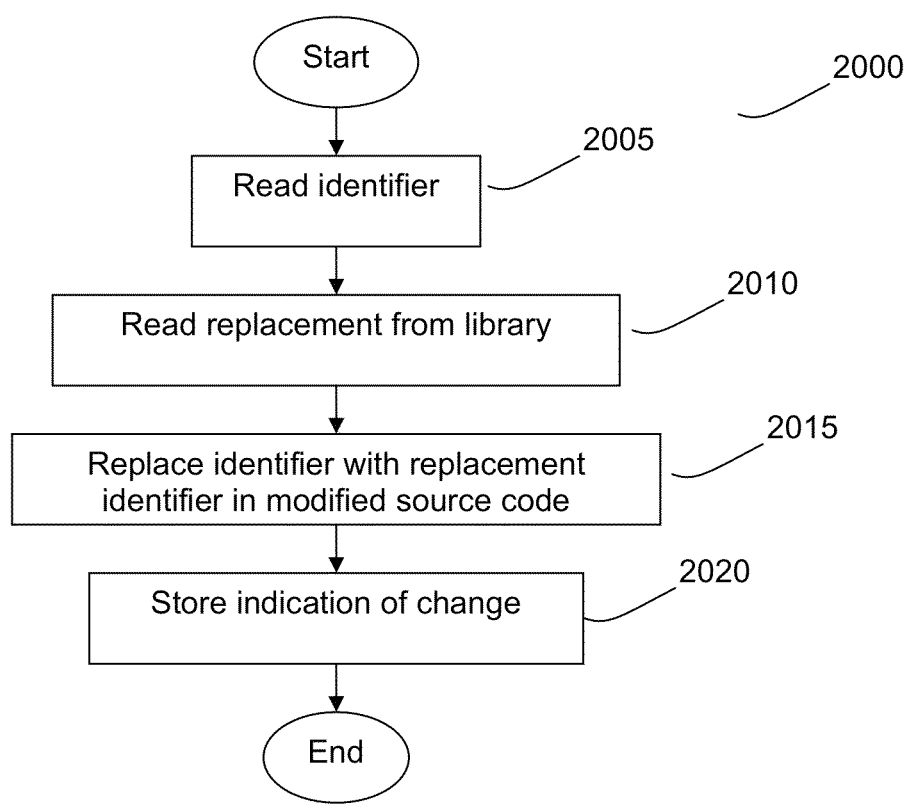
FIG. 20 illustrating a flow diagram of a process for replacing an identifier in accordance with an embodiment of this invention.

FIG. 20 illustrates process 2000 that is an embodiment for replacing identifiers from the original source code and storing the replaced identifiers in the modified source code. Process 2000 begins in step 2005 by reading an identifier from the parsed source code. For purposes of this discussion, an identifier is a word or string of characters used to identify a function, constant, and/or a value in the source code. When the identifier is read, a suitable substitute identifier is read from a name change database in step 2010. Preferably, the name change database is a topic-based database that includes a hierarchy between identifiers for use with object to signify inheritance. The selected substitute identifier replaces the original name in the modified source code in step 2015. An indication of the relationship between the original identifier and the substitute identifier is stored in the conversion data in step 2020 and process 2000 ends.

FIG. 21 illustrates a modified source code for main application file 1405 where the strings in the original main application file have been replaced in accordance with process 1900 described above. Each string has been modified to have characters with the shown modified encodings. FIG. 22 illustrates the modified source code after process 2000 described above has been used to replace the identifiers. Note the original identifiers have been replaced by species of birds.

Figure 23:
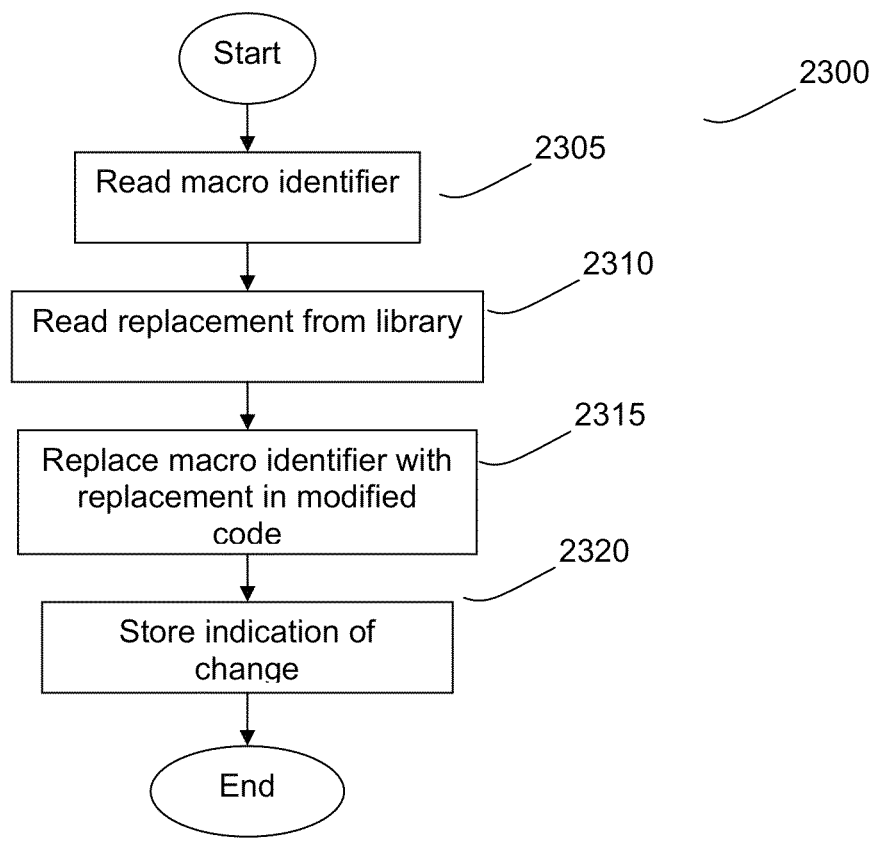
FIG. 23 illustrating a flow diagram of a process for replacement of macro identifiers in the modified source code in accordance with an embodiment of this invention.

FIG. 23 illustrates process 2300 for replacing macro identifiers in accordance with an embodiment of this invention. Process 2300 begins in step 2305 by reading a macro identifier from the parsed source code. For purposes of this discussion, a macro identifier is a word or string of character used to identify a constant, and/or value in the source code having a global scope. When the macro identifier is read, a suitable substitute identifier is read from a name change database in step 2310. The selected substitute identifier replaces the original name in the modified source code in step 2315. An indication of the relationship between the original identifier and the substitute identifier is stored in the conversion data in step 2320 and process 2300 ends.

FIG. 24 illustrates modified source code derived from the main application 1405 of source code 1400. In FIG. 24, the macros in main application 1405 have been replaced with replacement macros 2405. FIGS. 25 and 26 show the entire modified source code derived from source code 1400.

The above is a description of embodiments of a system for modifying information pertaining to a software system. It is envisioned that those skilled in the art can and will design alternative embodiments that infringe on this invention as set forth in the following claims.

The invention claimed is:

1. A system for modifying material related to computer software comprising:
   a processing unit; and
   a memory storing computer executable instructions that, when executed by the processing unit, cause the processing unit to:
      receive an original disclosure for a software system,
      apply a masquerading algorithm to said original disclosure to generate a new disclosure wherein subject matter of said disclosure is different from said new disclosure,
      receive original source code for said software system, and
      apply a camouflaging algorithm to said original source code to generate modified source code and conversion data for converting between said modified source code and said original source code,
      wherein said instructions to apply said masquerading algorithm further comprise instructions for directing said processing unit to:
      extract keywords from said original disclosure,
      select a model template using said keywords, and
      generate said new disclosure using said selected model template and said keywords,
         wherein said instructions to extract said keywords further comprise instructions for directing said processing unit to:

read a vocabulary library from memory,
apply a keyword extraction algorithm to said original disclosure using said vocabulary library,
determine said keywords from said original disclosure,
determine at least one use case from said original disclosure, and
determine keywords for each said use case; and
wherein said instructions to select said model template comprise:
  instructions for directing said processing unit to:
    determine a similarity value for each use case of said original disclosure with each use case of each of a plurality of model templates using a word similarity database wherein said word similarity database stores a relationship between words; and
    determine a template model that is a best match to said original disclosure based upon said similarity value of each use case of said original disclosure and each use case of said template model.

2. The system of claim 1 wherein said instructions further comprise:
instructions for directing said processing unit to:
  compile said modified source code to generate modified executable code.

3. The system of claim 1 wherein said instructions to apply said masquerading algorithm comprise:
instructions for directing said processing unit to:
  display said keywords extracted from said original disclosure to a user, and
  receive an input of edits to said keywords from said user.

4. The system of claim 1 wherein said instructions to generate said new disclosure comprise:
instructions for directing said processing unit to:
  read a domain specific vocabulary library from memory,
  apply a keyword extraction algorithm to said new disclosure using said vocabulary library, and
  determine sensitive words in said new disclosure.

5. The system of claim 1 wherein said instructions to apply a camouflaging algorithm to said original source code to generate modified source code and conversion data comprise:
instructions for directing said processing unit to:
  receive said source code,
  parse said source code,
  identify an equation in said source code, and
  generate a modified equation in said source from said equation identified in said source code.

6. The system of claim 1 wherein said instructions further comprise:
instructions for directing said processing unit to:
  encrypt said conversion data using a key, and
  providing said key to said user.

7. A method performed by a computer system for modifying material related to computer software comprising:
receiving an original disclosure for a software system;
applying a masquerading algorithm to said original disclosure to generate a new disclosure wherein subject matter of said disclosure is different from said new disclosure;
receiving original source code for said software system; and
applying a camouflaging algorithm to said original source code to generate modified source code and conversion data for converting between said modified source code and said original source code:
wherein said step of applying said masquerading algorithm further comprises:
  extracting keywords from said original disclosure;
  selecting a model template using said keywords; and
  generating said new disclosure using said selected model template and said keywords;
wherein said step of extracting said keywords comprises:
reading a vocabulary library from memory;
applying a keyword extraction algorithm to said original disclosure using said vocabulary library;
determining said keywords from said original disclosure;
determining at least one use case from said original disclosure; and
determining keywords for each said use case, and
wherein said step of selecting said model template comprises:
determining a similarity value for each use case of said original disclosure with each use case of each of a plurality of model templates using a word similarity database wherein said word similarity database stores a relationship between words; and
  determining a template model that is a best match to said original disclosure based upon said similarity value of each use case of said original disclosure and said template model.

8. The method of claim 7 further comprising:
compiling said modified source code to generate modified executable code.

9. The method of claim 7 wherein said step of applying said masquerading algorithm further comprises:
displaying said keywords extracted from said original disclosure to a user; and
receiving an input of edits to said keywords from said user.

10. The method of claim 7 wherein said step of applying a camouflaging algorithm to said original source code to generate modified source code and conversion data comprises:
receiving said source code;
parsing said source code;
identifying an equation in said source code; and
generating a modified equation in said source from said equation identified in said source code.

11. The method of claim 7 further comprising:
encrypting said conversion data using a key, and
providing said key to said user.

12. The method of claim 7 wherein said step of generating said new disclosure comprises:
reading a domain specific vocabulary library from memory;
applying a keyword extraction algorithm to said new disclosure using said vocabulary library; and
determining sensitive words in said new disclosure.

13. A system for modifying material related to computer software comprising:
circuitry configured to receive an original disclosure for a software system;
circuitry configured to apply a masquerading algorithm to said original disclosure to generate a new disclosure wherein subject matter of said disclosure is different from said new disclosure;
circuitry configured to receive original source code for said software system; and
circuitry configured to apply a camouflaging algorithm to said original source code to generate modified source code and conversion data for converting between said modified source code and said original source code,
wherein said circuitry configured to apply said masquerading algorithm further comprises:
  circuitry configured to extract keywords from said original disclosure;
  circuitry configured to select a model template using said keywords, and circuitry configured to generate said new disclosure using said selected model template and said keywords;

wherein said circuitry configured to extract said keywords comprises:
- circuitry configured to read a vocabulary library from memory;
- circuitry configured to apply a keyword extraction algorithm to said original disclosure using said vocabulary library;
- circuitry configured to determine said keywords from said original disclosure;

circuitry configured to determine at least one use case from said original disclosure; and circuitry configured to determine keywords for each said use case, wherein said circuitry configured to select said model template comprises:
- circuitry configured to determine a similarity value for each use case of said original disclosure with each use case of each of a plurality of model templates using a word similarity database wherein said word similarity database stores relationship between words; and
- circuitry configured to determine a template model that is a best match to said original disclosure based upon said similarity value of each use case of said original disclosure and said template model.

14. The system of claim 13 further comprising:
circuitry configured to compile said modified source code to generate modified executable code.

15. The system of claim 13 wherein said circuitry configured to apply said masquerading algorithm comprises:
- circuitry configured to display said keywords extracted from said original disclosure to a user; and
- circuitry configured to receive an input of edits to said keywords from said user.

16. The system of claim 13 wherein said circuitry configured to generate said new disclosure comprises:
- circuitry configured to read a domain specific vocabulary library from memory;
- circuitry configured to apply a keyword extraction algorithm to said new disclosure using said vocabulary library; and
- circuitry configured to determine sensitive words in said new disclosure.

17. The system of claim 13 wherein said circuitry configured to apply a camouflaging algorithm to said original source code to generate modified source code and conversion data comprises:
- circuitry configured to receive said source code;
- circuitry configured to parse said source code;
- circuitry configured to identify an equation in said source code; and
- circuitry configured to generate a modified equation in said source from said equation identified in said source code.

18. The system of claim 17 wherein said circuitry configured to modify said equation comprises:
circuitry configured to reorder of a plurality of elements in said equation.

19. The system of claim 13 further comprising:
- circuitry configured to encrypt said conversion data using a key; and
- circuitry configured to providing said key to said user.

* * * * *